United States Patent Office 3,661,985
Patented May 9, 1972

3,661,985
PROCESS FOR THE PRODUCTION OF NON-CAKING UREA

Jean Cluzel and Paul Souviron, Toulouse, France, assignors to Azote et Produits Chimiques S.A., Toulouse, France
No Drawing. Filed Jan. 2, 1969, Ser. No. 788,643
Claims priority, application France, Jan. 2, 1968, 134,582
Int. Cl. C07c 127/00
U.S. Cl. 260—555 C                                   3 Claims

ABSTRACT OF THE DISCLOSURE

Urea with a small content of biuret and which does not cake on storage is produced by coating granulated urea having 0.9 to 1.2% by weight of water, obtained by starting from a concentrated solution at a temperature below 130°, with a film of hexamethylene tetramine formed in situ by reaction at 0 to 50° C. between a 32 to 42% by weight solution of formol (aqueous formaldehyde), having a pH of 3 to 6, atomized onto the granules, and excess ammonia content in said granules as they leave the granulation stage.

---

The present invention relates to improvements in the manufacture of urea with a low content of biuret and which does not cake in storage.

The formation of biuret by condensation of two molecules of urea with elimination of one molecule of ammonia, is very difficult to avoid when the concentration of the solutions obtained from the synthesis is carried out at temperatures above 130° even for a limited period of time.

The presence of this dimer is undesirable in most uses of urea, in agricultural uses as well as in the plastic materials art and in the artificial textile art, to cite only the most important uses.

Certain methods make it possible to avoid, to a certain extent, the formation of the said compound by carrying out the concentration of the solutions and the crystallization of the urea at low temperatures. The obtained product is melted and granulated after being freed from water and dried.

Such methods of operation require the use of troublesome and complicated apparatus. In addition, they require at least the partial recycling of the mother liquors of the crystallization, enriched in biuret, to the synthesis reactor. This operation, in the course of which there occurs the conversion of biuret into urea, under elevated pressure and in the presence of an excess of ammonia, unfavorably influences the equilibrium of the ammonium carbamate into urea and water due to the increase in the concentrations of these two reaction partners. The result is that, for a given apparatus, there is a distinct reduction in production capacity.

The present invention relates to improvements in the method of making urea by suppressing all these prior art defects. It consists, in principle, in a limited concentration of the solutions at a relatively low temperature, of the order of 125 to 130° C., and in coating the final product with a film of hexamethylene tetramine formed in situ by the reaction by the residual ammonia existing in the urea granules and a solution of formol finally sprayed onto the said granules.

In practice, it is indispensable in order to avoid any trouble in storage, to achieve a uniform and regular coating.

The final water content by weight of the granules is comprised between 0.9 and 1.2% in order to make it possible to achieve the 46% by weight nitrogen content required for agricultural urea. The granules also comprise 600 to 1000 parts by million of ammonia at the outlet of the granulation chamber. It is desirable to regulate the speed of reaction between the ammonia and the formol in such manner that the formation of the hexamethylene tetramine is not immediate but that it is nevertheless finished at the outlet of the reaction apparatus. The factors acting on this speed of reaction are essentially constituted by the temperature of the urea granules and the acidity of the formol employed.

According to the invention, the temperature of the urea granules is kept between 0 and 50° C., the 32–42% solution of formaldehyde having added thereto from 0.1 to 0.2% of nitric acid for temperatures between 0 and 15° C. The pH of the solution of formaldehyde is thus comprised between 3.0 and 6.0.

The obtained product is especially stable to storage, even in non-conditioned atmospheric environment.

The method of the invention is carried out in any suitable apparatus. It is thus possible to use the coating drums currently employed in the fertilizer industry, with the condition that the granules can reside therein for several instances and the speed of formation of the hexamethylene tetramine is correspondingly controlled.

The temperature of the urea particles can be fixed with great precision in the granulation chambers traversed in counter-current by atmospheric air, the feed of which may be varied as desired.

The following example is given by way of illustration and is not at all intended to be limitative of the invention.

EXAMPLE

The urea solution obtained at the outlet of a synthesis reactor, and containing by weight:

|  | Percent |
|---|---|
| Urea | 75 |
| Biuret | 0.30 |
| Water | 24.7 | is concentrated under reduced pressure of 110–120 millimeters of mercury at a temperature of 128–130° C. in a film flow exchanger. After granulation, the urea shows:

|  | Percent by weight |
|---|---|
| $N_2$ | 46.19 |
| Biuret | 0.4 |
| Water | 1.00 |

Ammonia, residual, 1000 p.p.m.

15 tons per hour of this product of an average granule size comprises between 1 and 2 mm. are treated with 45 kilograms per hour of a 35% solution of formaldehyde at a pH of 5.8, in a coating drum of the conventional type. Formol is atomized at 40° C. onto the granules at an approximate temperature of 30°, the duration of contact in the apparatus being about 7 to 10 minutes. The treated urea has no formaldehyde odor. Its composition is as follows:

|  | Percent |
|---|---|
| $N_2$ | 46.13 |
| Biuret | 0.40 |
| Water | 1.10 |

What is claimed is:
1. A method for preparing free flowing granulated urea having a low biuret content which comprises concentrating an aqueous urea solution obtained by synthesis from carbon dioxide and ammonia, at a temperature ranging between 125 and 130° C. in order to obtain urea granules containing 0.9 to 1.2% of water and 600 to 1000 parts per million of ammonia by weight, spraying an aqueous solution of formaldehyde on said granules and collecting the granules coated with hexamethylene tetramine formed by reaction of formaldehyde on the non-reacted ammonia contained in granules.

2. A method for preparing granulated urea as defined in claim 1 according to which the granules are maintained at a temperature ranging from 0 to 50° C. during spraying with the formaldehyde aqueous solution and wherein the formaldehyde aqueous solution has a pH value ranging from 3.0 to 6.0, the lower pH values within this range being used for the higher temperatures.

3. A method for preparing granulated urea as defined in claim 1 according to which the granules are maintained at a temperature ranging from 0 to 15° C. and wherein an aqueous acidified formaldehyde solution having a pH value ranging from 3 to 4.5 is sprayed on the granules, said acidified formaldehyde solution being prepared by adding 0.1 to 0.2% by weight of nitric acid to an aqueous formaldehyde solution containing 32 to 42% by weight of formaldehyde.

References Cited

UNITED STATES PATENTS 2,933,527    4/1960    Guyer et al. _____ 260—555 B

FOREIGN PATENTS

| | | | |
|---|---|---|---|
| 648,549 | 9/1962 | Canada _____ | 260—555 |
| 722,434 | 1/1955 | Great Britain _____ | 260—248.6 |
| 819,030 | 8/1959 | Great Britain _____ | 260—555 |
| 875,730 | 8/1961 | Great Britain _____ | 260—555 |
| 944,875 | 12/1963 | Great Britain _____ | 260—555 |
| 1,049,464 | 11/1966 | Great Britain _____ | 260—555 |

BERNARD HELFIN, Primary Examiner

M. W. GLYNN, Assistant Examiner

U.S. Cl. X.R.

260—555 B; 117—100 A, DIG 3